United States Patent Office 3,478,101
Patented Nov. 11, 1969

3,478,101
METHOD OF RESOLVING dl-EPHEDRINE INTO ITS OPTICALLY ACTIVE COMPONENTS
Masanori Tsuruga and Shogo Murakami, Himi-shi, and Katsutoshi Kondo, Shunei Akabane, Kenji Washikita, and Tameo Koshino, Takaoka-shi, Japan, assignors to Fuji Chemical Industries, Ltd., Takaoka-shi, Toyama-ken, Japan
No Drawing. Filed Sept. 9, 1966, Ser. No. 578,125
Claims priority, application Japan, Sept. 16, 1965, 40/56,374
Int. Cl. C07c 91/22; A61k 27/00
U.S. Cl. 260—570.6               7 Claims

ABSTRACT OF THE DISCLOSURE

A method for producing d-ephedrine and l-ephedrine of high purity and in high yields by resolving dl-ephedrine with D-arabonic acid. The present invention also provides for the production of the intermediate compounds d-ephedrine-D-arabonate and l-ephedrine-D-arabonate by the reaction of dl-ephedrine with the D-arabonic acid.

---

The present invention relates to a method for resolving dl-ephedrine with a high yield into high purity d-ephedrine and l-ephedrine from the standpoint of optical activity with considerable industrial advantage and great ease. Particularily it relates to a method which involves D-arabonic acid or metal salts thereof as a resolving agent in said resolution. More particularly, the present invention relates to a method for resolving dl-ephedrine into its optically active components which is characterized by reacting dl-ephedrine with D-arabonic acid as a resolving agent or salts of dl-ephedrine with metal salts of D-arabonic acid in the presence of a reaction solvent to form d-ephedrine D-arabonate and l-ephedrine-D-arabonate salts, separating the d-ephedrine D-arabonate thus formed by precipitation, obtaining the l-ephedrine D-arabonate by removing the solvent from the remaining mother liquor, and decomposing the d- or l-ephedrine D-arabonate thus obtainel by acid or alkali.

The method of resolving racemic compounds into optically active components using appropriate compounds as a resolving agent is of course a means known as "resolution."

With respect to the resolution of dl-ephedrine also, proposals have heretofore been advanced to obtain l-ephedrine using said known means. However, it was impossible to obtain a resolving agent which could satisfactorily attain the objective of resolution. Consequently, no industrially practicable method has been discovered.

The d-ephedrine thus obtained has been used as an agent to resolve the racemic form of an optically active acid substance into optically active components, and the l-ephedrine finds wide applications in medical treatment as a stimulant for the sympathetic nervous system, particularly as a remedy for bronchial asthma, etc. Consequently it has been the long-cherished desire of the industry to offer an industrially practicable method of resolving dl-ephedrine into its optically active components.

The general method of resolving the racemic base into its optically active d-base and l-base consists in reacting the racemic base with appropriate optically active acids (d or l form) to form a mixture of the salts of d-base-acid (d or l form) and l-base-acid (d or l form), namely, a mixture diastereoisomers, by repetition of resolving crystallization utilizing the different solubilities of these diastereoisomers in appropriate solvents, purifying the diastereoisomers thus obtained by recrystallization or otherwise and recovering the d- or l-base by decomposition. For the resolution of the racemic base, therefore, it has been desired that these diastereoisomers vary widely in their properties, particularly solubility and crystallizable properties, and it has been deemed of vital importance to discover a resolving agent capable of producing such diastereoisomers. Moreover, if the resolving agent cannot be procured or prepared at low cost and with ease it will have no industrial significance. The synthetic resolving agent (optically active acid) is generally a racemic form of acid. To convert this to an optically active acid useful as a resolving agent, it is neessary to resolve it into optical antipodes in advance. Moreover, the process involved is so complicated that it is difficult to operate industrially. From these considerations, optically active natural organic acids are mainly used.

As described above, the resolution of the racemic base into a useful d- and/or an l-components with industrial advantage requires an appropriate agent. However, since it is impossible to predict what compounds will constitute a useful resolving agent for the racemic compounds to be treated, it is difficult to find out such compounds. In fact, there has been no industrially valuable method for the resolution of dl-ephedrine.

As contained in the literature, the resolving agents used on trial in the proposals advanced for the purpose of resolving dl-ephedrine include l-monomenthol ester of succinic acid (United States Patent 2,240,319), d- and l-mandelic acid (Journal of the American Chemical Society, vol. 51, p. 1908), d-α-[4-arsono-anilino]-propionamide (Bulletin de la Sociéte Chimique de France [4] vol. 43, p. 1254–1256) and d-tartaric acid. Among these resolving agents, the l-monomenthol ester of succinic acid is prepared by partially esterifying optically inactive succinic acid with natural l-menthol which is optically active but chemically neutral, so as to impart optical activity to the succinic acid while preserving its acidity. Due to the presence of ester bonds, this material is chemically unstable in treatment after resolution, nor it is procurable from the market. Moreover, even if it should be synthesized, its industrial utilization would be difficult because of the high cost of l-menthol. Also, d- and l-mandelic acid, and d-α-[4-arsonoanilino] propionamide are all synthesized substances, besides they are not commercially available. Even though they may be synthesized, it is necessary to resolve the racemic form first of all. Consequently these substances are not usable in the industrial resolution of dl-ephedrine. In contradistinction, d-tartaric acid is relatively inexpensive and procurable from the market.

As a result of perusing the literature on the resolution of dl-ephedrine by d-tartaric acid, it has been found that the Journal of the Pharmaceutical Society of Japan (vol. 47, 1927, p. 109) (literature (1) describes a process which comprises heating and dissolving dl-ephedrine and d-tartaric acid in methanol, subjecting the crystals precipitated upon cooling and the mother liquor thereof to repeated resolution and crystallization, recrystallizing the crystals thus obtained with methanol several times and, after purification, decomposing the crystals to obtain l-ephedrine and also purifying the crystals precipitated by concentrating and strongly quenching the aforesaid crystallization mother liquor and the recrystallization mother liquor and thereafter decomposing to obtain d-ephedrine, the yield in each case approaching the theoretical. From the foregoing process, it is seen that of the diastereoisomers, l-ephedrine d-bitartrate and d-ephedrine d-bitartrate, formed upon reacting dl-ephedrine with d-tartaric acid, the former crystallized out first, because it was more difficultly soluble in methanol than the latter.

However, the German Patent 549,970 (literature (2)) states that when dl-ephedrine is reacted with d-tartaric acid in aliphatic alcohols having 2 to 8 carbons d-ephedrine d-bitartrate crystallizes out first. According to this literature d-ephedrine d-bitartrate is shown to be difficultly soluble. Further, the Journal of the American Chemical Society, vol. 51, p. 1906–1909 (literature (3)) indicates that while d-tartaric acid readily forms crystalline salts with dl-ephedrine, it is incapable of resolving said ephedrine, thus completely denying the possibility of dl-ephedrine being resolved by d-tartaric acid used as a resolving agent.

As described above, the previous methods proposed for resolution of dl-ephedrine to obtain d- and l-form are industrially infeasible. Furthermore, as may be inferred from obvious discrepancies among the descriptions of the aforesaid literatures, the inconsistent proposals are evidence that it was a very difficult technical problem to make industrially possible the resolution of dl-ephedrine with high purity and yield and also with great ease.

The inventors have conducted studies to provide a method for resolving dl-ephedrine to obtain l-ephedrine, an important pharmaceutical, and also d-ephedrine which is a useful resolving agent, with great ease, high purity and yield industrially. As a result, we have discovered that the use of inexpensive and readily procurable D-arabonic acid as a resolving agent permits the resolution into l- and d-form with extremely high purity without repeating numerous resolving cycles, and also that the remarkable contraction of the resolving process lends itself to greatly improved yields, enabling dl-ephedrine to be resolved into l-ephedrine and/or d-ephedrine very easily and advantageously from the industrial standpoint.

Furthermore, we tried the resolution of dl-ephedrine pursuant to the aforesaid literature (1) in order to see whether it was industrially possible to resolve dl-ephedrine by d-tartaric acid. The procedure consisted in heating and dissolving equal moles of dl-ephedrine and d-tartaric acid in methanol equal to 3 to 5 times the ephedrine, allowing to stand in an ice box overnight while stirring at intervals, resolving the bitartrates as produced or after being purified by recrystallization with methanol, thereafter obtaining the ephedrine in the form converted to hydrochlorides. As a result, it was found that the hydrochloride thus produced was dextrorotatory. This was contradictory to the description of literature (1), whereas it agreed with that of literature (2). The optical rotation of the hydrochloride obtained was $[\alpha]_D+3.0$ to $0°$ when the bitartrate was not purified and $[\alpha]_D+8.6$ to $0°$ even when said bitartrate was purified. The foregoing procedure only resulted in the production of dl-ephedrine hydrochloride containing slight excesses of d-ephedrine hydrochloride, indicating an extremely low resolution efficiency. As already stated in literature (3), therefore, it was disclosed that the resolution of dl-ephedrine with d-tartaric acid as a resolving agent could reasonably be deemed substantially impracticable from the industrial standpoint.

Thus, one of the causes for the low optical purity of the ephedrine resolved by d-tartaric acid is considered to lie in the fact that the diastereoisomers produced had only slightly different solubilities in the solvent. In fact, the solubilities of both d-ephedrine-d-bitartrate and l-ephedrine-d-bitartrate in 100 ml. of methanol were 3.98 g. and 5.24 g. respectively, presenting no appreciable difference in solubility. Thus it is assumed that resolution and crystallization only resulted in precipitating mixtures of two types of diastereoisomer and that the ephidrine obtained by resolution of these crystals had a low optical purity. Of course it may be possible to improve the optical purity of the product ephedrine by several repetitions the recrystallization and purification of the diastereoisomers formed. However, such a repetition of recrystallization itself is not only a complicated procedure, but also inevitably reduces the yield, so that it is substantially difficult and disadvantageous to carry out this process industrially. Therefore it is found out that the aforesaid method has little practical value, because the d-tartaric acid involved does not satisfactorily function as a resolving agent for dl-ephedrine.

When dl-ephedrine is reacted with D-arabonic acid according to the present invention, d-ephedrine D-arabonate and l-ephedrine D-arabonate are formed. It has been disclosed that these diastereoisomers are strikingly different in solubility and crystallizable property, so that only one resolving crystallization with an appropriate solvent is sufficient to separate them almost completely. The solubility of the former in 100 ml. of methanol is 1.9 g. at 10° C. and 0.11 g. at 28° C. in 100 ml. of ethanol, so that it readily crystallizes out of the solvent. However, the latter mixes with the solvent at given rates and does not precipitate easily, even when the solution is concentrated or when the solvent is distilled out. In other words, it has been discovered that when said diastereoisomer mixture is heated and dissolved in, for example, lower aliphatic alcohols and allowed to stand upon cooling, only d-ephedrine D-arabonate can be made to crystallize out in a pure form with a yield of more than 90 percent, and the almost pure l-ephedrine D-arabonate dissolved in the mother liquor is easily obtained in a pasty form by removing the solvent from the mother liquor.

Thus, the objective of the present invention is to provide an industrially profitable and feasible method for resolving dl-ephedrine into optically active forms, l-ephedrine and/or d-ephedrine with high purity and yield and great ease by use of a resolving agent which is procurable readily and at low cost.

D-arabonic acid used as a resolving agent in the process of the present invention is not obtained from natural sources. However, it is an intermediate for D-ribose required as raw material for synthesis of vitamin $B_2$, and thus produced in quantity and at low cost as alkali metal salts of D-arabonic acid which is obtained with a high yield by catalytically oxidizing D-glucose in alkaline medium with oxygen or air using known means.

The d-ephedrine D-arabonate resolved by the process of the present invention is pure, so that recrystallization and purification as has been observed in the use of the previous resolving agents are deemed unnecessary to obtain d-ephedrine. Moreover, the resultant good yield eliminates the necessity of repeating a complicated cycle of resolution and crystallization as has been the case with the previous resolving agents. Upon decomposing the aforesaid salts, optically pure d-ephedrine is obtained immediately and that with a high yield. Thus the resolving process of the present invention is remarkably superior from the practical standpoint.

Further, it should be noted that the d-ephedrine D-arabonate as described above is a compound that has never been published in any literature. It is a compound having a melting point of 153° C., $[\alpha]_D+17.5°$ (water). On the other hand, we have conducted studies on the crystallization of a reaction product corresponding to the l-ephedrine D-arabonate obtained by reacting l-ephedrine with D-arabonic acid, but we have not yet succeeded in said crystallization.

Such a great difference in crystallizable property of the diastereoisomers is a definitely favorable factor in carrying out resolution on an industrial scale. This is one of the characteristics of D-arabonic acid in which it particularly excels any other resolving agents.

The use of D-arabonic acid according to the process of the present invention enables dl-ephedrine to be divided into component diastereoisomers by a single cycle of resolution and crystallization with high yield and purity. Thus the subsequent resolution of these diastereoisomers produces d- and l-ephedrine with the same yield and purity. The process of the present invention eliminates a complicated and disadvantageous step of repeating resolution and crystallization, and makes it possible to manufacture useful, optically active ephedrine with great ease and supply the product to the market at low cost.

The process of the present invention permits the use of D-arabonic acid crystals themselves. However, the objective of the present invention may be more fully attained by use of the aqueous solution of the D-arabonic acid prepared by reacting the aqueous solution of easily procurable metal salts of D-arabonic acid with appropriate acids or by treating said aqueous solution with cation exchange resins to remove metal ions. Alternatively, it is possible to use D-arabonolactone, a substance dehydrated from the molecule of D-arabonic acid. In aqueous solution, a part of the D-arabonolactone changes into D-arabonic acid, and the equilibrium is attained between the arabonic acid and the lactone. When dl-ephedrine is reacted with D-arabonolactone in the presence of water, the D-arabonolactone reacts with water and is converted to D-arabonic acid, forming salts with dl-ephedrine. Hence, the term "reaction of dl-ephedrine with D-arabonic acid," as used in the process of the present invention, includes all the foregoing cases.

The objective of the present invention may also be accomplished by reacting salts of dl-ephedrine with metal salts of D-arabonic acid in the presence of water.

Said metal salts of D-arabonic acid generally include alkali metal salts or alkaline earth metal salts. For example, salts of sodium, potassium, calcium and barium may be given. Salts of calcium or barium are especially excellent from the viewpoint of high yield and ease of operation. The salts of dl-ephedrine may include hydrochloride and sulfate. The sulfate is especially excellent from the viewpoint of high yield and ease of operation. However, when metal salts of D-arabonic acid and salts of dl-ephedrine are reacted in a reaction solvent, as in the case where barium D-arabonate and dl-ephedrine sulfate are reacted in water, it is desired that proper combinations of reaction solvents and reactants be selected in such a manner that the metal salts formed by reaction of the cation portion of the D-arabonic acid metal salts with the anion portion of the salt of dl-ephedrine are sufficiently insoluble in reaction solvents to be easily removed from the reaction system.

The solution of reaction products as used in the process of the present invention is prepared (1) by heating and dissolving dl-ephedrine and usually an equivalent amount of D-arabonic acid in lower aliphatic alcohols or (2) by heating and dissolving dl-ephedrine and D-arabonolactone in lower aliphatic alcohols containing water above the equivalent to the D-arabonolactone or (3) by heating and dissolving dl-ephedrine in the aqueous solution of D-arabonic acid or D-arabonolactone and thereafter again heating and dissolving in lower aliphatic alcohols the residue obtained by removing water from the reaction solution. An alternative method of preparing said solution of reaction products consists in adding the aqueous solution of the salts of dl-ephedrine or their solution in water-containing lower aliphatic alcohols to the aqueous solution of D-arabonic acid metal salts or their solution in water-containing lower aliphatic alcohols, filtering the metal salts precipitated from the exchange reaction, dissolving in lower aliphatic alcohols the residue obtained by distilling the reaction solvent from the filtrate and, if required, filtering insoluble materials.

Thus in the process of the present invention, the reaction solvent generally consists of at least one of the solvents selected from the group consisting of water and lower aliphatic alcohols when the reactants are dl-ephedrine and D-arabonic acid, and also consists of water or water containing lower aliphatic alcohols when the reactants are salts of dl-ephedrine and metal salts of D-arabonic acid. Also where the D-arabonic acid is used in the form of D-arabonolactone, it is required to adopt the aforesaid condition in which water or water-containing lower aliphatic alcohols are present.

When the solution of reaction products is allowed to stand and cool in order to reduce its temperature, pure d-ephedrine D-arabonate precipitates with a good yield. If required, it is possible to obtain additional crystals by concentrating the mother liquor from which the aforesaid precipitates have been separated.

With respect to the lower aliphatic alcohols used as a reaction solvent in obtaining the above-mentioned solution, the preferable ones are those having three or less carbons, particularly methanol and ethanol in consideration of the solubility of the ephedrine salts of D-arabonic acid.

When D-arabonic acid and dl-ephedrine are reacted, it is not always necessary to use equivalent amount of both. It is possible to reduce the quantity of D-arabonic acid to 0.5 mol against 1 mol of dl-ephedrine. In other words, it is possible to decrease the amount of D-arabonic acid to the equivalent of d- or l-ephedrine of which dl-ephedrine is composed. However, when the quantity of D-arabonic acid is reduced, the precipitation rate of d-ephedrine D-arabonate slightly falls at the time of resolution and crystallization, as compared with the case in which the equivalent of said acid is used.

The d-ephedrine D-arabonate and l-ephedrine D-arabonate thus obtained are easily decomposed by mineral acids or alkali into d- and l-ephedrine respectively. Thus when d-ephedrine D-arabonate is added to aqueous alkali solutions, for example, dilute solutions of sodium hydroxide or potassium hydroxide, the D-arabonate is decomposed into alkali metal salts of D-arabonic acid and d-ephedrine, the latter separating in the oily form. Therefore, when extraction is conducted with a solvent immiscible with water such as benzene and the solution is distilled out of the extract, then d-ephedrine is obtained. Or if the extract is treated with acid, for example, dilute hydrochloric acid or dilute sulfuric acid by conventional means, d-ephedrine is obtained as the hydrochloride or sulfate. The alkali metal salt of D-arabonic acid is recovered from the extraction mother liquor of d-ephedrine effectively by concentration or other means. This may be used again in resolving dl-ephedrine. When reacted with dilute hydrochloric acid, d-ephedrine D-arabonate is decomposed into D-arabonic acid and d-ephedrine hydrochloride. When water is distilled from the reaction solution, D-arabonic acid is converted into D-arabonolactone, leaving mixtures of D-arabonolactone with d-ephedrine hydrochloride. When, therefore, D-arabonolactone is washed out with an organic solvent, for example, acetone, ephedrine hydrochloride is recovered with a good yield. Further, when acetone is distilled out of the acetone wash solution, D-arabonolactone is recovered with a good yield, and the recovered lactone can be used again in resolving dl-ephedrine, offering great industrial advantage. Of the aforementioned resolving methods, that by alkali is complicated, whereas that by mineral acids is more preferable. The d-ephedrine hydrochloride thus obtained has an optical rotation of $[\alpha]_D +33.0$ to $+36.0°$ (water), well in accord with the value given in literature. It is optically pure and requires no purification.

On the other hand, the l-ephedrine D-arabonate obtained in a pasty form produces l-ephedrine by a similar decomposing method. The l-ephedrine hydrochloride thus produced can be made optically purer easily by recrystallization with water or ethanol. This is l-ephedrine hydrochloride meeting the specifications of Pharmacopoea Internationalis: melting point 217° to 220° C.; optical rotation $[\alpha]_D -33.0°$ to $-36.0°$. It can also be produced with a very high yield.

The process of the present invention will be understood more clearly with reference to the examples which follow. It should be noted, however, that the present invention is not limited to these examples.

EXAMPLE 1

Mix 33 g. (0.2 mol) of dl-ephedrine and 33.2 g. (0.2 mol) of D-arabonic acid with 160 ml. of methanol. Heat in reflux condition for 1 hour and allow to stand in an ice box. Filter out the crystals of d-ephedrine D-arabonate precipitated and wash with methanol. d-Ephedrine D-arabonate is obtained with the yield 29.9 g. (90.6% by weight), the melting point is 152° C., $[\alpha]_D+17.2°$. Add the crystals to 100 ml. of 10 percent hydrochloric acid and after heating, distil out water in a vacuum. Add 100 ml. of acetone to the residue solidifying upon cooling, boil and reflux. Filter out d-ephedrine hydrochloride insoluble in acetone, and wash with acetone. The d-ephedrine hydrochloride is obtained with the yield of 16.9 g. (84% by weight on the basis of the dl-ephedrine used), the melting points is 218° C., $[\alpha]_D+34.6°$.

Mix together the mother liquor from which the crystals of d-ephedrine D-arabonate have been separated and the rinsings, and distil methanol therefrom. 37.2 g. of pasty residue (l-ephedrine D-arabonate) is obtained. Add 100 ml. of 10 percent hydrochloric acid and after heating, distil out water in a vacuum. Add 800 ml. of acetone to the residue obtained. Boil and filter out insoluble solids in acetone, followed by recrystallization of the precipitate with water. l-Ephedrine hydrochloride is obtained with the yield of 15.8 g. (79% by weight on the basis of the dl-ephedrine used), the melting point is 220° C., $[\alpha]_D-34.8°$.

EXAMPLE 2

Add 33 g. (0.2 mol) of dl-ephedrine and 29.6 g. (0.2 mol) of D-arabonolactone to 160 ml. of water. Heat at 85 to 90° C. for 1 hour and distil out water in a vacuum. Heat and dissolve the pasty residue obtained in 175 ml. of methanol. Allow to stand overnight at 5° C. Filter out the crystals of the d-ephedrine D-arabonate precipitated and wash with 50 ml. of methanol. Said d-ephedrine D-arabonate is obtained with the yield of 27 g. (81.6% by weight), the melting point of 152.5° C. $[\alpha]_D+17.9°$. Mix the mother liquor and the rinsings and distil methanol therefrom. Allow to stand with addition of 100 ml. of isopropanol. Then 4.1 g. (12.4% by weight of d-ephedrine D-arabonate is further obtained, the melting point is 150° C., the total yield is 94%.

Upon distilling the solvent from the mother liquor from which d-ephedrine D-arabonate has been separated, about 38 g. of pasty residue (l-ephedrine D-arabonate) are obtained. By treating the salt thus produced in the same manner as described in Example 1, 17.0 g. of d-ephedrine hydrochloride are obtained; yield 84.6 percent and melting point 218° C. $[\alpha]_D+33.4°$. On the other hand, 17.4 g. of l-ephedrine hydrochloride are obtained by the same treatment as in Example 1; yield 86.3 percent and melting point 219° C., $[\alpha]_D-34.0°$.

EXAMPLE 3

Add 33 g. (0.2 mol) of dl-ephedrine and 16.3 g. (0.11 mol) of D-arabonolactone to 160 ml. of water. Heat at 85 to 90° C. for 1 hour. Distil out water in a vacuum. Heat and dissolve the pasty residue (51 g.) obtained in 130 ml. of methanol and allow to stand overnight at 5° C. Filter out the crystals of d-ephedrine D-arabonate precipitated and wash with 50 ml. of cold methanol. d-Ephedrine D-arabonate is obtained with the yield of 22 g. (66.1% by weight), the melting point is 151.5° C., $[\alpha]_D+16.8°$. On the other hand, distil methanol from the mother liquor and allow to stand with addition of 20 ml. of isopropanol. 4.6 g. (13.9% by weight) of d-ephedrine D-arabonate are further obtained, the melting point is 152° C., the total yield is 80.0 percent.

EXAMPLE 4

Add 16.5 g. (0.1 mol) of dl-ephedrine and 14.8 g. (0.1 mol) of D-arabonolactone to 160 ml. of 97 percent ethanol containing water. Reflux for 6 hours and filter out the d-ephedrine D-arabonate precipitated upon cooling. 13.8 g. of d-ephedrine D-arabonate are obtained; yield 84 percent and melting point 151° C., $[\alpha]_D+17.2°$. Upon concentration and evaporation to dryness of the filtrate, about 20 g. of pasty l-ephedrine D-arabonate are obtained. By treating both salts as in Example 1, d- and l-ephedrine hydrochloride are obtained.

EXAMPLE 5

Heat and dissolve 42.8 g. (0.1 mol) of dl-ephedrine sulfate and 46.8 g. (0.1 mol) of barium D-arabonate in 60 ml. and 100 ml. of water respectively. Mix both solutions. Filter out the barium sulfate precipitated and distil out water in a vacuum. Add 200 ml. of ethanol to the residue and heat. Allow to stand overnight at 5° C. Filter out the crystals of the d-ephedrine D-arabonate precipitated and wash with 50 ml. of ethanol. 30.2 g. of d-ephedrine D-arabonte are obtained; yield 91 percent and melting point 152° C., $[\alpha]_D+17.0°$. On the other hand, by concentration and evaporation to dryness of the filtrate, 38 g. of pasty l-ephedrine D-arabonate are obtained. By treating both salts as in Example 1, d- and l-ephedrine hydrochloride are obtained.

EXAMPLE 6

Dissolve 71.5 g. (0.15 mol) of calcium arabonate pentahydrate in 100 ml. of water and add 15.2 g. of concentrated sulfuric acid. Stir at room temperature for 30 minutes and filter out the calcium sulfate precipitated. Add 49.5 g. (0.3 mol) of dl-ephedrine to the filtrate. After stirring at 50° C. for 1 hour, distil out water in a vacuum. Heat and dissolve in 300 ml. of ethanol and allow to stand at 10° C. for 5.5 hours. Filter out the crystals precipitated and wash with 200 ml. of ethanol 43.3 g. of d-ephedrine D-arabonate are obtained; yield 87 percent and melting point 149° to 151° C. $[\alpha]_D+17.3°$. By treating this salt as in Example 1, 23.7 g. of d-ephedrine hydrochloride are obtained; yield 79 percent and melting point 217° C., $[\alpha]_D+33.5°$. On the other hand, by treating as in Example 1 the mother liquor from which d-ephedrine D-arabonate has been separated, 22.2 g. (73.9% by weight) of l-ephedrine hydrochloride are obtained, the melting point is 218° C., $[\alpha]_D-33.0°$.

EXAMPLE 7

Decompose 60.5 g. (0.3 mol) of ephedrine hydrochloride ($[\alpha]_D-15.1°$; optical purity 45 percent as l-ephedrine hydrochloride) with sodium hydroxide. Add the ephedrine obtained to the solution consisting of 47 g. (0.315 mol) of D-arabonolactone and 240 ml. of water. Heat at 85° to 90° C. for 1 hour and distil out water in a vacuum. Heat and dissolve the residue in a mixed solution containing 50 ml. of methanol and 100 ml. of isopropanol and allow to stand in an ice box. Filter out the d-ephedrine D-arabonate precipitated and wash with 100 ml. of isopropanol. 25 g. (91.5% by weight) of the d-ephedrine D-arabonate are obtained, the melting point is 149.5° C., $[\alpha]_D+16.6°$. Mix the filtrate and the rinsings and distil out methanol and isopropanol in a vacuum. Add 150 ml. of 10 percent hydrochloric acid. Heat and evaporate to dryness in a vacuum. Add 1000 ml. of actone and boil. 43 g. (98% by weight) of crude l-ephedrine hydrochloride are obtained as insoluble crystals in acetone, the melting point is 217° C., $[\alpha]_D-32.2°$ and optical purity 96 percent.

Having described the specification, we hereby claim:

1. Method for resolving dl-ephedrine into its optically active components which is characterized by reacting in the presence of a reaction solvent selected from the group consisting of water, lower alkyl alcohols and mixtures thereof, (1) dl-ephedrine and D-arabonic acid as a resolving agent on (2) a mineral acid salt of dl-ephedrine and an alkali or alkaline earth metal salt of D-arabonic acid, to form d-ephedrine D-arabonate and l-ephedrine D-arabonate, precipitating and separating the d-ephedrine D-arabonate produced and, on the other hand, obtaining the l-ephedrine D-arabonate by removing the solvent from the mother liquor from which d-ephedrine D-arabonate has been separated and decomposing the d- or l-ephedrine D-arabonate obtained with a mineral acid or a caustic alkali.

2. Method according to claim 1 which is characterized by the fact that the reactants are dl-ephedrine and D-arabonic acid.

3. Method according to claim 1 which is characterized by the fact that the reactants are the mineral acid of dl-ephedrine and an alkali or alkaline earth metal salt of D-arabonic acid.

4. Method according to claim 1 which is characterized by the fact that said reaction solvent is a lower alkyl alcohol of 1 to 3 carbon atoms.

5. Method according to claim 1 which is characterized by the fact that said D-arabonic acid is introduced into the reaction system in the form of D-arabonolactone in the presence of water.

6. Method according to claim 1 which is characterized by the fact that said salt of dl-ephedrine is selected from the group consisting of hydrochloric acid salt and sulfuric acid salt.

7. Method according to claim 1 which is characterized by the fact that said metal salt is selected from the group consisting of salts of sodium, potassium, calcium and barium.

References Cited

UNITED STATES PATENTS

| | | | |
|---|---|---|---|
| 1,867,274 | 7/1932 | Manske | 260—570.6 X |
| 2,211,630 | 8/1940 | Stuart | 260—501.17 |
| 2,460,239 | 1/1949 | Pickel et al. | 260—343.6 |
| 2,460,240 | 1/1949 | Pickel et al. | 260—343.6 |
| 3,129,259 | 4/1964 | Gardner et al. | 260—501.17 X |

OTHER REFERENCES

Rodd, "Chemistry of Carbon Compounds," vol. 1B, pp. 1218–19 (1952).

ROBERT V. HINES, Primary Examiner

U.S. Cl. X.R.

260—501.17, 531, 537, 999, 343.6